US009123162B2

(12) United States Patent
Burley et al.

(10) Patent No.: US 9,123,162 B2
(45) Date of Patent: Sep. 1, 2015

(54) INTEGRATION CONE TRACING

(75) Inventors: Brent Burley, Monterey Park, CA (US); Andrew Selle, Montrose, CA (US); Christian Eisenacher, Burbank, CA (US); Gregory Nichols, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 153 days.

(21) Appl. No.: 13/493,929

(22) Filed: Jun. 11, 2012

(65) Prior Publication Data
US 2013/0328875 A1     Dec. 12, 2013

(51) Int. Cl.
*G06T 15/06* (2011.01)
*G06T 15/50* (2011.01)

(52) U.S. Cl.
CPC ............... *G06T 15/06* (2013.01); *G06T 15/50* (2013.01)

(58) Field of Classification Search
None
See application file for complete search history.

(56) References Cited

U.S. PATENT DOCUMENTS

| | | | |
|---|---|---|---|
| 5,045,995 A | | 9/1991 | Levinthal |
| 5,923,330 A | | 7/1999 | Tarlton |
| 6,016,150 A | * | 1/2000 | Lengyel et al. ............... 345/426 |
| 6,300,965 B1 | * | 10/2001 | Sowizral et al. ............. 345/622 |
| 6,326,964 B1 | | 12/2001 | Snyder |
| 6,496,601 B1 | | 12/2002 | Migdal |
| 6,714,936 B1 | | 3/2004 | Nevin |
| 7,095,409 B2 | | 8/2006 | Cook |
| 7,129,940 B2 | | 10/2006 | Cook |
| 7,168,074 B1 | | 1/2007 | Srinivasa |
| 7,289,119 B2 | | 10/2007 | Heirich |
| 7,675,518 B1 | * | 3/2010 | Miller ........................ 345/426 |
| 7,783,695 B1 | | 8/2010 | Tyrrell |
| 8,106,906 B1 | | 1/2012 | Duff |
| 8,174,524 B1 | | 5/2012 | Laur |
| 8,217,949 B1 | | 7/2012 | Carpenter |
| 8,400,447 B1 | | 3/2013 | Carr |
| 8,411,082 B1 | | 4/2013 | Cook |
| 8,416,260 B1 | | 4/2013 | Carpenter |
| 8,436,856 B1 | | 5/2013 | Duff |

(Continued)

OTHER PUBLICATIONS

Crassin, C. et al.: "Interactive Indirect Illumination Using Voxel Cone Tracing", Pacific Graphics 2011, vol. 30, No. 7, 2011, 10 pages, Retrieved from the Internet: <URL:https://research.nvidia.com/sites/default/files/publications/GIVoxels-pg2011-authors.pdf>.

(Continued)

*Primary Examiner* — Said Broome
(74) *Attorney, Agent, or Firm* — Farjami & Farjami LLP

(57) ABSTRACT

A method is provided for integration cone tracing with particular application for feature films and other demanding content creation using scenes of high complexity requiring global illumination. Instead of using a conventional noise prone ray tracer, cones are intersected with a scene bounding hierarchy to determine intersecting scene geometry, and integration results are computed by directional sampling within the cones. As a result, the working data set may be reduced as the rendering may begin with a smaller set of cones as compared to the large number of rays required for acceptable filtering in a conventional ray tracer. Furthermore, by refining the cones during the rendering only on an as-needed basis according to an acceptable noise threshold and by sharing secondary cone bounces among primary cones, the processing workload and data set requirements may be kept to a reasonable level even for multiple global illumination passes.

19 Claims, 4 Drawing Sheets

(56) References Cited

U.S. PATENT DOCUMENTS

| | | |
|---|---|---|
| 8,436,867 B1 | 5/2013 | Duff |
| 8,466,919 B1 | 6/2013 | Duff |
| 8,493,383 B1 | 7/2013 | Cook |
| 2002/0050990 A1 | 5/2002 | Sowizral |
| 2005/0146522 A1 | 7/2005 | Maillot |
| 2005/0243086 A1 | 11/2005 | Schechter |
| 2006/0209067 A1 | 9/2006 | Pellacini |
| 2007/0262988 A1 | 11/2007 | Christensen |
| 2008/0180440 A1 | 7/2008 | Stich |
| 2009/0225081 A1 | 9/2009 | Keller |
| 2009/0262132 A1 | 10/2009 | Peterson |
| 2010/0231589 A1 | 9/2010 | Salsbury |
| 2012/0147015 A1 | 6/2012 | Rogers |
| 2013/0016107 A1 | 1/2013 | Dharmapurikar |
| 2014/0285499 A1 | 9/2014 | Iwasaki |

OTHER PUBLICATIONS

Arvo, J.: "Fast Ray Tracing by Ray Classification", ACM, 2 Penn Plaza, Suite 701—New York, USA, vol. 21, No. 4, Jul. 1987, 10 pages.

Amanatides, J.: "Ray tracing with cones" Computers and Graphics, Elsevier, GB, vol. 18, No. 3, Jul. 1, 1984, pp. 129-135, 7 pages.

Wald, I. et al: "Interactive Global Illumination using Fast Ray Tracing", ACM, 2 Penn Plaza, Suite 701—New York, USA, 2002, 11 pages.

Wikipedia: "Stencil Buffer", Apr. 3, 2012, Retrieved from the Internet: <URL:http://en.wikipedia.org/w/index.php?title=Stencil_buffer&oldid=485283047> 2 pages.

EESR dated Feb, 7, 2013 re Application No. 13160552.9.

Afra, A., "Incoherent Ray Tracing without Acceleration Structures", Eurographics 2012 Short Paper, 4 pages.

Aila et al. 2010. Architecture considerations for tracing incoherent rays. In *Proceedings of the Conference on High Performance Graphics* (HPG '10). Eurographics Association, Aire-la-Ville, Switerzerland, Switzerland, 113-122.

Arvo et al., Fast ray tracing by ray classification, Proceedings of the 14th annual conference on Computer graphics and interactive techniques, p. 55-64, Aug. 1987 [doi>10.1145/37401.37409].

Benthin et al., Combining Single and Packet-Ray Tracing for Arbitrary Ray Distributions on the Intel MIC Architecture, IEEE Transactions on Visualization and Computer Graphics, v.18 n.9, p. 1438-14, Sep. 2002.

Bikker, J., Improving Data Locality for Efficient In-Core Path Tracing, Computer Graphics Forum, v.31, n.6, p. 1936-1947, Sep. 2012, [doi>10.1111/j.1467-8659.2012.03073.x].

Boulos et al.: Adaptive ray packet reordering. In *Proc. of Interactive Ray Tracing* (2008).

Budge et al.: Out-of-core data management for path tracing on hybrid resources. In *Computer Graphics Forum* (2009).

Christensen et al., "Ray Tracing for the Movie 'Cars'", Interactive Ray Tracing 2006, IEEE Symposium,, Sep. 18-20, 2006, pp. 1-6.

Crassin et al. (2011), Interactive Indirect Illumination Using Voxel Cone Tracing. Computer Graphics Forum, 30: 1921-1930, doi: 10.1111/j.1467-8659.2011.02063.x.

Dammertz et al., Shallow bounding volume hierarchies for fast SIMD ray tracing of incoherent rays, Proceedings of the Nineteenth Eurographics conference on Rendering, Jun. 23-25, 2008, Sarajevo, Bosnia and Herzegovina.

Ernst et al.: Multi bounding volume hierarchies. In Proc. of Interactive Ray Tracing (2008).

Garanzha et al.: Fast ray sorting and breadth-first packet traversal for GPU ray tracing, *Computer Graphics Forum* (2010).

Gribble et al.: Coherent ray tracing via stream filtering. In *Proc. of Interactive Ray Tracing* (2008).

Hanika et al., Two-level ray tracing with reordering for highly complex scenes, Proceedings of Graphics Interface 2010, May 31-Jun. 2, 2010, Ottawa, Ontario, Canada.

Hanrahan, P., Using caching and breadth-first search to speed up ray-tracing, Proceedings on Graphics Interface '86/Vision Interface '86, p. 56-61, Aug. 1986, Vancouver, British Columbia, Canada.

Hoberock et al., Stream compaction for deferred shading, Proceedings of the Conference on High Performance Graphics 2009, Aug. 1-3, 2009, New Orleans, Louisiana [doi>10.1145/1572769. 1572797].

Kato et al., "Parallel Rendering and the Quest for Realism: The 'Kilauea' Massively Parallel Ray Tracer", Practical Parallel Processing for Today's Rendering Challenges, SIGGRAPH 2001, Course Note #40, ACM, Aug. 2001, Los Angeles, USA, Aug. 12-17, 1 p.

Kato, T., "Kilauea": parallel global illumination renderer, Proceedings of the Fourth Eurographics Workshop on Parallel Graphics and Visualization, Sep. 9-10, 2002, Blaubeuren, Germany.

Keller et al., "Efficient Ray Tracing without Auxiliary Acceleration Data Structure", HPG 2011, 1 page.

Moon et al., Cache-oblivious ray reordering, ACM Transactions on Graphics (TOG), v.29 n.3, p. 1-10, Jun. 2010 [doi>10.1145/1805964. 1805972].

Nakamaru et al., Breadth-First Ray Tracing Utilizing Uniform Spatial Subdivison, IEEE Transactions on Visualization and Computer Graphics, v.3 n.4, p. 316-328, Oct. 1997 [doi>10.1109/2945. 646235].

Navratil et al., Dynamic Ray Scheduling to Improve Ray Coherence and Bandwidth Utilization, Proceedings of the 2007 IEEE Symposium on Interactive Ray Tracing, p. 95-104, Sep. 10-12, 2007 [doi>10.

Overbeck et al.: Large ray packets for real-time Whitted ray tracing. In *Proc. of Interactive Ray Tracing* (2008).

Pantaleoni et al., PantaRay: fast ray-traced occlusion of massive scenes, ACM Transactions on Graphics (TOG), v.29 n.4, Jul. 2010 [doi>10.1145/1778765.1778774].

Pharr et al., Rendering complex scenes with memory-coherent ray tracing, Proceedings of the 24th annual conference on Computer graphics and interactive techniques, p. 101-108; Aug. 1997 [doi>10. 1145/258734.2587.

Ramani et al., 2009. StreamRay: a stream filtering architecture for coherent ray tracing. *SIGPLAN* Not. 44, 3 (Mar. 2009), 325-336. DOI=10.1145/1508284.1508282 http://doi.acm.org/10.1145/1508284.1508282.

Reinhard et al., Hybrid scheduling for parallel rendering using coherent ray tasks, Proceedings of the 1999 IEEE symposium on Parallel visualization and graphics, p. 21-28, Oct. 25-26, 1999, San Francisco, California.

Reshetov et al., Multi-level ray tracing algorithm, ACM Transactions on Graphics (TOG), v.24 n.3, Jul. 2005 [doi>10.1145/1073204. 1073329].

Tsakok, J., Faster incoherent rays: Multi-BVH ray stream tracing, Proceedings of the Conference on High Performance Graphics 2009, Aug. 1-3, 2009, New Orleans, Louisiana [doi>10.1145/1572769. 1572793].

Wald et al. "SIMD Ray Stream Tracing—SIMD Ray Traversal with Generalized Ray Packets and On-the-fly Re-Ordering." *Informe Técnico, SCI Institute* (2007).

Wald et al., Interactive distributed ray tracing of highly complex models, Proceedings of the 12th Eurographics conference on Rendering, Jun. 1, 2001, London, UK [doi>10.2312/EGWR/EGWR01/277-288].

Wald et al.: Getting rid of packets: efficient SIMD single-ray traversal using multi-branching BVHs. In Proc. of Interactive Ray Tracing (2008).

U.S. Appl. No. 12/043,041, filed Mar. 5, 2008, Titled "Multithreading in Rendering ", First Named Inventor: Fong.

U.S. Appl. No. 12/120,711, filed May 15, 2008, Titled "Lagrangian Filtering", First Named Inventor: Carpenter.

U.S. Appl. No. 12/533,965, filed Jul. 31, 2009, Titled "System and Methods for Implementing Object Oriented Structures in a Shading Language", First Named Inventor: Duff.

U.S. Appl. No. 13/280,258, filed Oct. 24, 2011, Titled "Programmable System for Artistic Volumetric Lighting", First Named Inventor: Nowrouzezahrai.

\* cited by examiner

INTEGRATION CONE TRACING

BACKGROUND

Realistic lighting is an important component of high quality computer rendered graphics. By utilizing a renderer employing a global illumination model, scenes can be provided with convincing reflections and shadows, providing the requisite visual detail demanded by feature length animated films and other content. Conventionally, a Monte Carlo based ray tracing renderer may be utilized to provide global illumination in a simple manner.

SUMMARY

The present disclosure is directed to integration cone tracing, substantially as shown in and/or described in connection with at least one of the figures, as set forth more completely in the claims.

DETAILED DESCRIPTION

Figure 1:
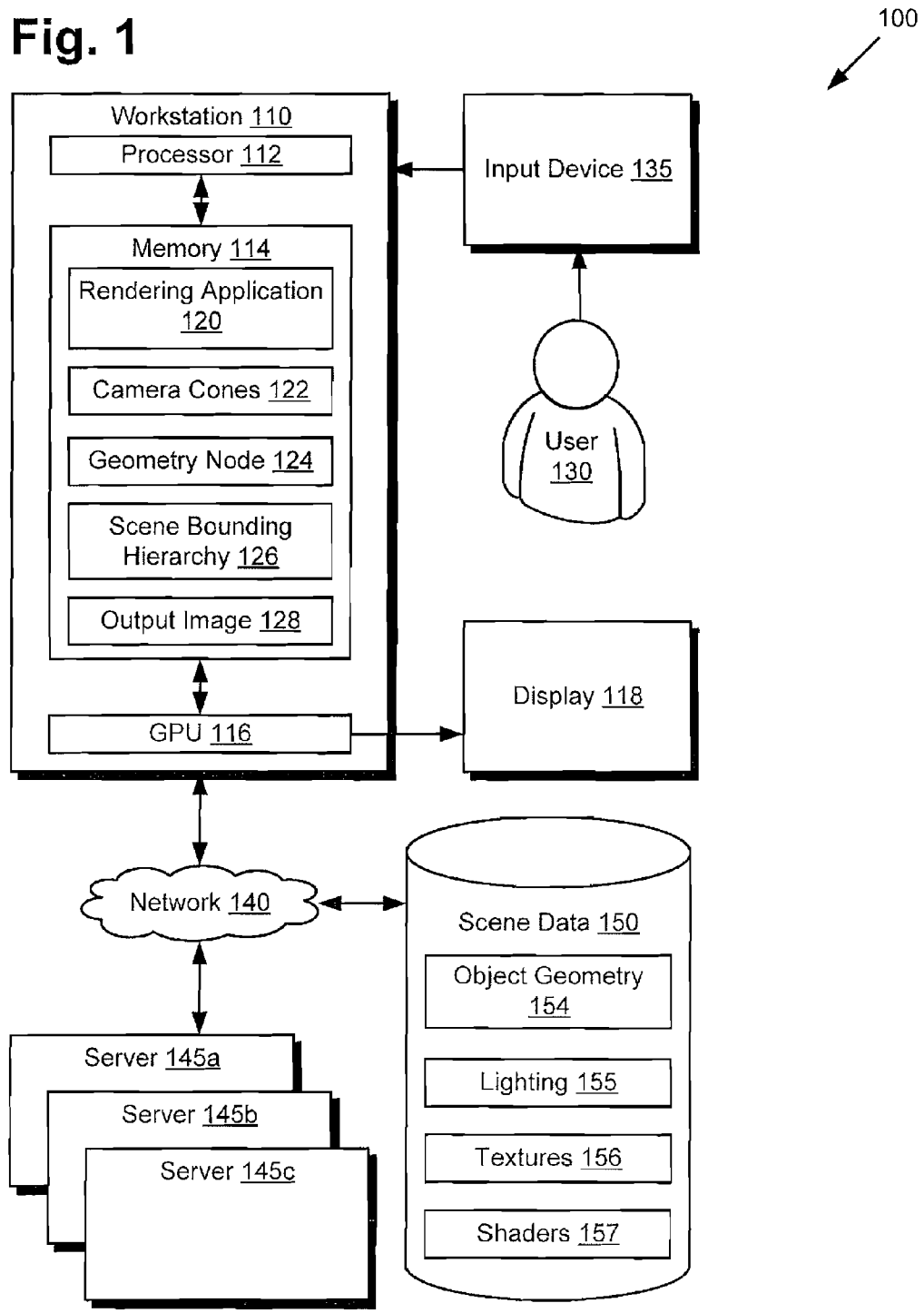
FIG. 1 presents an exemplary diagram of a system for providing integration cone tracing.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

With large processing overhead and highly random data access requirements, ray tracing becomes less suitable for complex scenes with larger amounts of data. Since memory requirements for efficient random access grow with scene complexity, the straightforward ray tracing renderer becomes impractical for rendering the highly detailed scenes required for feature films and other challenging applications.

Additionally, because of the random parameters inherent in Monte Carlo based ray tracing, many samples are required per pixel to provide adequate noise filtering in the final render. With high resolution rendering targets, the number of required samples may exceed available computational rendering capacity, as each half-wise reduction of noise requires a corresponding quadrupling of sample counts. While noise may be reduced in post-processing workflows, it is desirable to avoid such time-consuming and labor-intensive processes.

Accordingly, FIG. 1 presents an exemplary diagram of a system for providing integration cone tracing. Diagram 100 of FIG. 1 includes workstation 110, display 118, user 130, input device 135, network 140, servers 145a, 145b and 145c, and scene data 150. Workstation 110 includes processor 112, memory 114, and graphics processing unit (GPU) 116. Memory 114 includes rendering application 120, camera cones 122, geometry node 124, scene bounding hierarchy 126, and output image 128. Scene data 150 includes object geometry 154, lighting 155, textures 156, and shaders 157.

Workstation 110 may be any computing device such as a rackmount server, desktop computer, or mobile computer. User 130 may utilize input device 135, for example a keyboard and mouse, to direct the operation of rendering application 120 executing in memory 114 of processor 112. Rendering application 120 may process scene data 150 received from network 140 to generate a rendered output image 128 for output to display 118 through GPU 116. Network 140 may be a high speed network suitable for high performance computing (HPC), for example a 10 GigE network or an InfiniBand network. Once completed, output image 128 may also be copied to non-volatile storage, not shown in FIG. 1.

For simplicity, it is assumed that output image 128 is only a single frame, and that object geometry 154 already includes the positioning of all objects within the scene for the associated frame. However, in alternative implementations, scene data 150 may further include motion data for object geometry 154, in which case, several animation frames may be rendered by rendering application 120. Moreover, some implementations may render multiple frames of the same scene concurrently, for example, to provide alternative camera angles or to provide stereoscopic rendering.

Lighting 155 may include the properties of all light sources within the scene. Textures 156 may include all textures related to or used for object geometry 154. Shaders 157 may include any shaders related to or used to correctly shade object geometry 154. Other data may also be stored in scene data 150, such as for example, virtual camera parameters and camera paths.

As previously discussed, it is desirable to provide realistic lighting for a computer generated graphics rendering, or output image 128. While rasterizing renderers can provide high performance, global illumination can only be approximated. For demanding applications such as feature film rendering, global illumination is required from rendering application 120. However, if a conventional Monte Carlo based ray tracer is utilized for rendering application 120, significant noise is easily introduced into output image 128 unless a large number of samples are provided for filtering, which may be impractical for higher resolutions such as Full HD or 4K resolutions.

Accordingly, integration cone tracing is proposed for rendering application 120, rather than conventional ray tracing. Camera cones 122 for rendering output image 128 are generated within memory 114. Camera cones 122 may sample radiance values, visibility values, or any other scene attribute. Object geometry 154 is organized into a scene bounding hierarchy 126, which may be any type of bounding volume hierarchy (BVH). Object geometry 154 may thus be streamed into memory 114 according to a traversal of scene bounding hierarchy 126. Accordingly, object geometry 154 may be streamed as individual work units or nodes, with an exemplary geometry node 124 as shown in FIG. 1. Geometry node 124 may then be integrated within camera cones 122 using other elements of scene data 150 if needed, after which geometry node 124 may be freed from memory 114. Any bounces for evaluating secondary cones may also be queued for a future global illumination pass. Since all processing may be completed after freeing or deallocating the node from memory 114, each geometry node 124 of object geometry 154 may be accessed at most once, and may also be skipped if the geometry node is not visible in the current scene. In one configuration, the above streaming of object geometry 154 may be repeated for as many global illumination passes as desired, for example 2-4 passes.

Since each geometry node 124 is an individual work unit and can be processed without dependencies from other geometry nodes, servers 145a, 145b, and 145c may also be utilized for distributed parallel processing. However, in alternative implementations, depending on the complexity of scene data 150 and the available amount of memory 114, scene data 150 may be wholly stored in memory 114 or partially cached in memory 114.

Servers 145a, 145b, and 145c may contain components similar to those of workstation 110. SIMD (single instruction, multiple data) instructions on processor 112 and shaders on GPU 116 may be utilized to further enhance parallelism. Hierarchical traversal of camera cones 122 across scene bounding hierarchy 126 may also be utilized to reduce the number of integrations required.

Since scene geometry is integrated within cones for tracing, a much smaller number of cones is required for cone tracing compared to conventional ray tracing, where a large sampling of surface geometry intersections with camera rays is needed for sufficient noise filtering. More specifically, since filtering can be processed on-the-fly during cone integration rather than being deferred to a final filtering step, the number of cones may be reduced to a smaller number during the rendering process, with refinement through cone subdividing or sampling only if needed. For example, variance in the cone may be tracked using function objects and compared to a noise threshold to determine whether further refinement is desired. On the other hand, if less precision is desired, then computational shortcuts such as probabilistic integration may be utilized.

Figure 2:
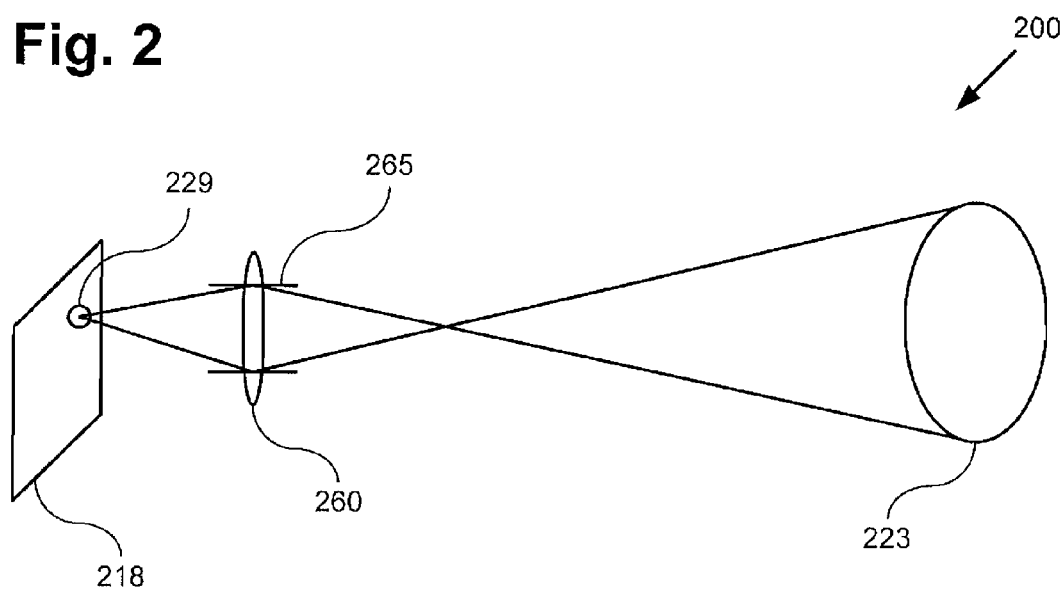
FIG. 2 presents an exemplary cone-based lens model for integration cone tracing.

FIG. 2 presents an exemplary cone-based lens model for integration cone tracing. Diagram 200 of FIG. 2 includes image plane 218, pixel 229, lens 260, aperture 265, and cone 223. With regards to FIG. 2, image plane 218 may correspond to display 118 of FIG. 1, which may display output image 128 formed from a grid of pixels, including pixel 229.

As shown in FIG. 2, a single cone 223 may be traced with scene geometry (not shown) integrated within cone 223 to determine the composition of pixel 229. Accordingly, a plurality of camera cones 122, including cone 223, is traced within a scene represented by scene data 150 to render a completed output image 128. Aperture 265 and lens 260 may be adjusted according to desired virtual camera parameters, with the size of cone 223 set to provide the desired level of detail (LOD). As a benefit of using a cone-based lens model, depth-of-field is naturally provided, and volume effects including photon beams, grids, and particles can be readily implemented by streaming cone 223 through a volume shader.

While diagram 200 shows a single cone 223 corresponding to a single pixel 229, alternative embodiments may also have cones corresponding to multiple pixels or "superpixels." In this manner, a smaller working set of primary cones may be utilized while refining the cones only if needed to fill out areas requiring more detail. Moreover, while cone 223 utilizes a cone shape, any arbitrary shape may be used including polygonal shapes, curved cones, time-varying shapes, and other non-circular shapes. For example, curved cones may be desired to provide non-linear stereo depth disparity and other artistic effects.

Figure 3A:
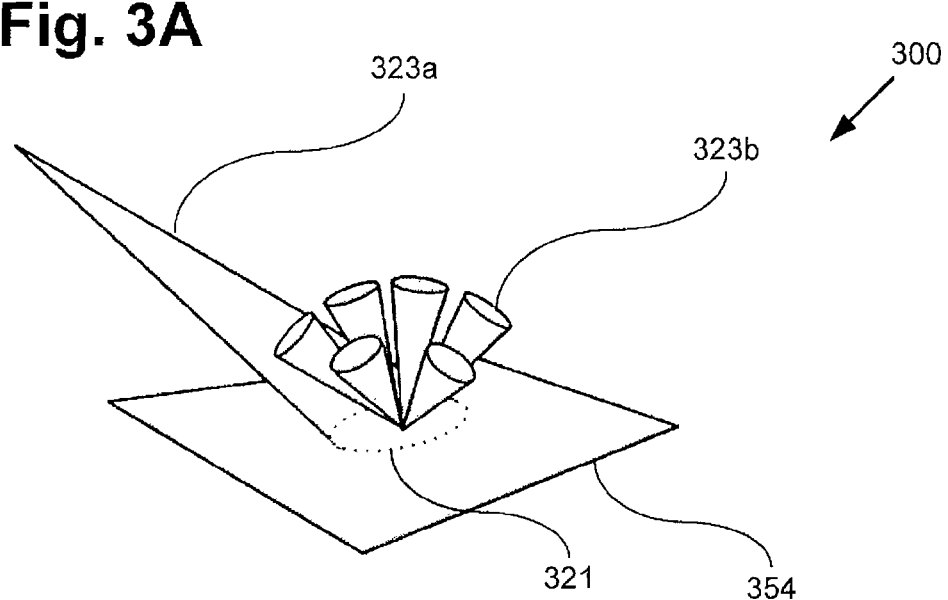
FIG. 3A presents an exemplary diagram of secondary bounces resulting from a primary cone to provide global illumination.

FIG. 3A presents an exemplary diagram of secondary bounces resulting from a primary cone to provide global illumination. Diagram 300 of FIG. 3A includes primary cone 323a, a plurality of secondary cones including an exemplary secondary cone 323b, shading hit 321, and geometry surface 354.

To provide global illumination, secondary cones for reflections or transmissions must be generated where primary cones generate shading hits on geometry surfaces. Thus, as shown in diagram 300 of FIG. 3A, a primary cone 323a may generate a shading hit 321 on geometry surface 354, resulting in a plurality of secondary cone bounces in an approximately hemispherical shape including the exemplary secondary code 323b. However, if primary cones are individually traced, and secondary cones are generated for each primary cone as in FIG. 3A, the number of secondary cones may quickly grow to an unmanageable size, especially for the multiple global illumination passes required for multiple reflections.

Figure 3B:
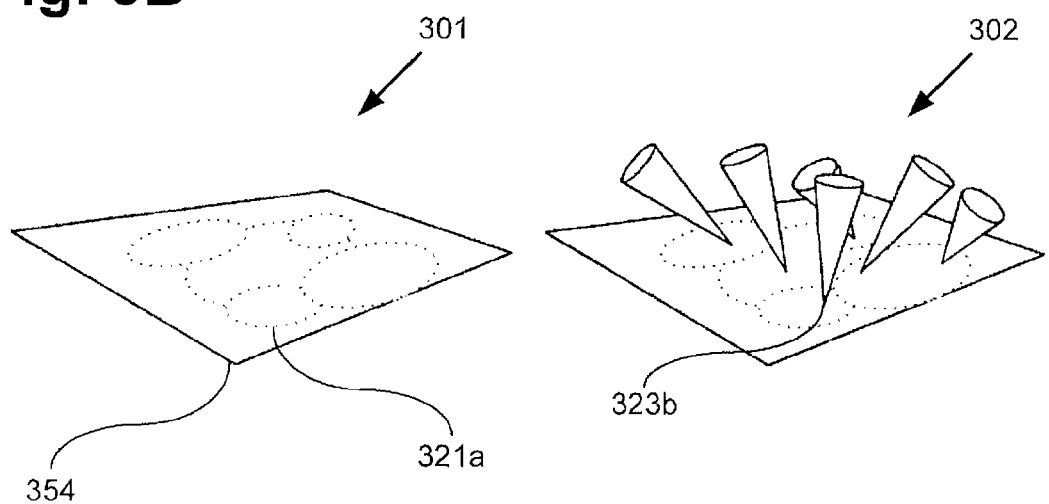
FIG. 3B presents an exemplary diagram of secondary bounce sharing for optimizing global illumination passes.

Thus, FIG. 3B presents an exemplary diagram of secondary bounce sharing for optimizing global illumination passes. Diagram 301 of FIG. 3B includes geometry surface 354 and a plurality of shading hits including an exemplary shading hit 321a. Diagram 302 of FIG. 3B includes a plurality of secondary cones including an exemplary secondary cone 323b.

Rather than immediately evaluating each set of secondary bounces for each individual primary cone, all shading hits from the primary cones for a given geometry surface 354, including the exemplary shading hit 321a, are first gathered in diagram 301. Then, a plurality of secondary cones minimally satisfying all of the shading hits is generated, including the exemplary secondary cone 323b in diagram 302. By sharing secondary bounces in this manner, the working set of secondary cones may be restricted to a reasonable number at each global illumination bounce pass while still providing sufficient visual quality. Smaller numbers of wider secondary cones may be favored while a large number of cones are still active, whereas larger numbers of smaller secondary cones may be favored when a smaller number of cones are active, for example after culling cones. The number of secondary cones may also be increased for areas of high variance.

Figure 4:
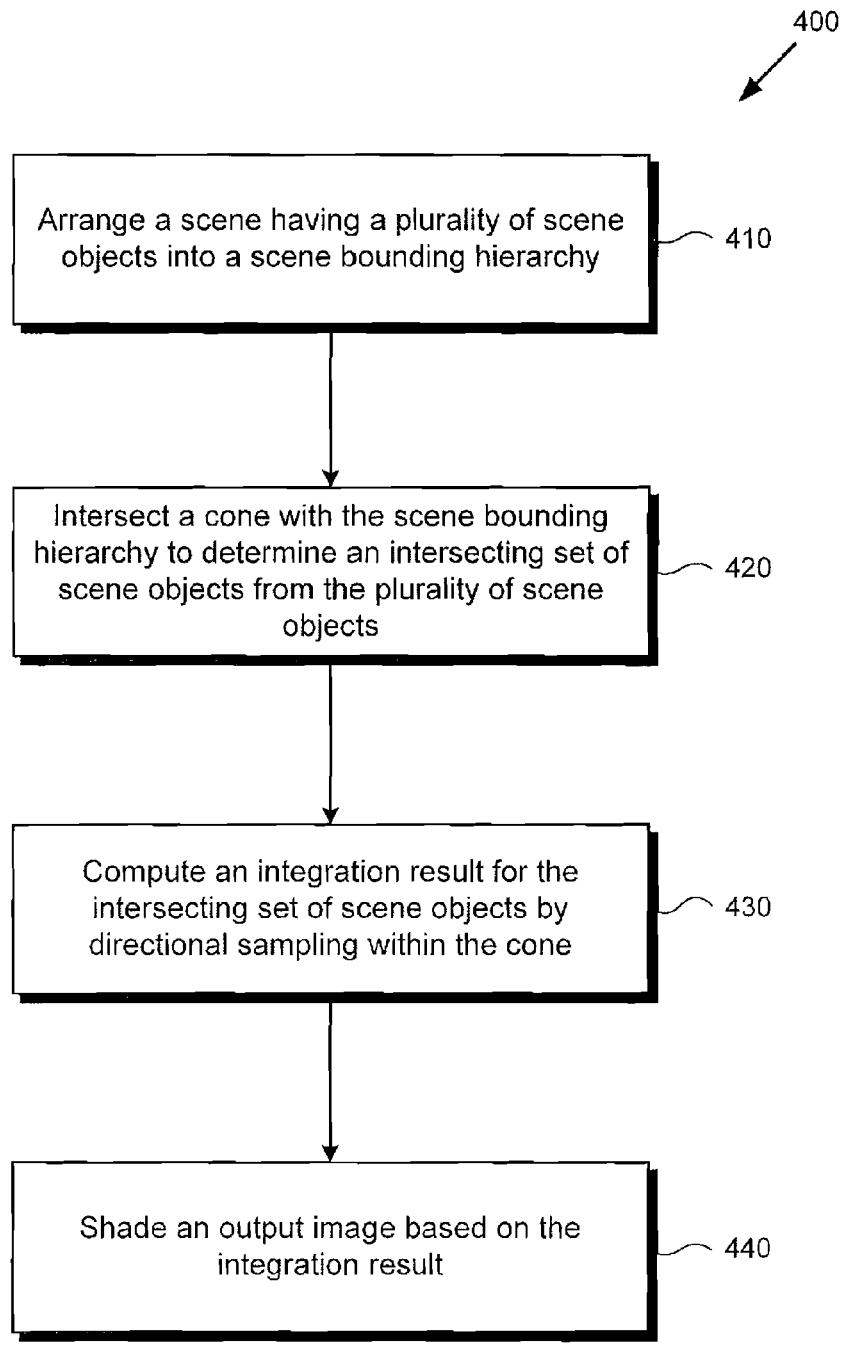
FIG. 4 presents an exemplary flowchart illustrating a method for providing integration cone tracing.

FIG. 4 presents an exemplary flowchart illustrating a method for providing integration cone tracing. Flowchart 400 begins when processor 112 of workstation 110 arranges a scene represented by scene data 150 into scene bounding hierarchy 126 (block 410). For example, object geometry 154 may be spatially divided into scene nodes, which are then organized into a tree-based bounding volume hierarchy (BVH) or another data structure. The tree may be organized as a binary, quad, or n-ary BVH, and may preferably be an n-ary BVH where n is at least three (3) for greater parallelism.

Next, processor 112 of workstation 110 generates camera cones 122 in memory 114 for tracing in a scene represented by scene data 150 (block 420). More specifically, one or more cones may be intersected with scene bounding hierarchy 126 to determine an intersecting set of scene objects from object geometry 154. Each camera cone 122 may map to a single pixel or multiple pixels (superpixels) of output image 128. Moreover, while the term "camera cone" is utilized, any shape may be utilized.

After camera cones 122 are generated according to the desired camera view of scene data 150, camera cones 122 may be organized and sorted, for example by origin point and direction vector, thereby facilitating bounding box (or sphere or other shape) testing. As previously discussed, camera cones may also be generated from multiple camera views to provide alternative views or to provide stereoscopic rendering, and may also be taken with different exposure times for motion blur. Since a large number of camera cones may need to be sorted, GPU 116 may be utilized for accelerated sorting.

For example, the high performance RadixSorting algorithm can sort over 1 G keys per second on a modern CUDA compatible GPU. See, "RadixSorting, High performance GPU radix sorting in CUDA", available from http://code.google-.com/p/back40computing/wiki/RadixSorting.

Once camera cones 122 are ready, processor 112 of workstation 110 accesses a plurality of geometry nodes from object geometry 154 for integration within camera cones 122. As discussed above, one method is to stream object geometry 154 from network 140 according to a traversal of scene bounding hierarchy 126, loading geometry node 124 as one work unit, performing all processing of geometry node 124 at once, and freeing geometry node 124. In other implementations, object geometry 154 may be completely or partially cached in memory 114. Since all computations are finished after freeing each node, each of the plurality of geometry nodes may be accessed no more than once, and may be skipped entirely if not visible in the scene, for example behind the camera view. After reducing the possible candidates of camera cones 122 for integration with geometry node 124 to determine the intersecting set of scene objects, for example by bounding box testing, cone integration may proceed and shading hits on geometry surfaces may be recorded accordingly.

Next, processor 112 of workstation 110 computes an integration result for the intersecting set of scene objects by directional sampling within camera cones 122 (block 430). In one implementation, the directional sampling may be by tracing rays within camera cones 122. The rays may be traced from the base of a given cone in camera cones 122 along an axis of the cone in one direction. The base may be positioned at the apex of the cone. Alternatively, the base may be placed at a section of the cone at a distance from the apex of the cone, for example to provide a particular focal distance for depth-of-field effects.

Thus, at each recorded hit surface, ray tracing point samples may be taken and various properties may be evaluated to determine the shading of the surface including the material properties of the object surface, lighting 155, textures 156, and shaders 157. Accordingly, output image 128 may be shaded based on the above evaluation of the integration result from the directional sampling (block 440). In other implementations, the directional sampling may be by tracing cones within camera cones 122. While the above example assumes a visibility estimate for the integrand, the integrand may also be a visibility function or any other scene function.

Furthermore, rather than just integrating radiance, the estimated gradient of the radiance may also be integrated in addition to the radiance to allow for smooth reconstruction. If geometry needs to be procedurally generated, displaced, instantiated, or tessellated, such operations may be performed here prior to the hit testing and may also take advantage of the natural coherence benefits from geometry node 124.

Alternatively, rather than sampling points within the cone, the cone may be subdivided and shaded as area integration with the geometry surface. In this manner, the generation of rays for surface sample points is avoided, and super-sampling of displacements, self-shadowing, and other computationally intensive tasks may be carried out only if needed.

If secondary cones are to be spawned according to lighting 155 and/or the reflective or transmissive properties of the object surface, for example to compute global illumination, the generation of these cones may be queued at scene nodes and deferred for coherent data access of object geometry and related shaders and textures. Additionally, secondary cones may by shared amongst primary or previous bounce cones to limit the number of cones required.

Even further, to determine complex object visibility within cones, space-time stencils may be provided within the cones. For example, in conventional cone tracing, a cone that is partially blocked by an object may simply estimate the opacity of the remaining cone trace by the amount of blockage. If a cone is cast on an object and is blocked by 50%, rendering application 120 may simply assume that the remainder of the cone to be rendered is at 50% opacity. However, this assumption falls short for correlated objects, for example, a perfect line of objects or a person and his shirt. Respecting correlated visibility is particularly important for motion blur, where moving correlated objects may only be visible in a cone during a fraction of the shutter time interval. Accordingly, space-time stencils may be utilized to account for complex object visibility in the scene, which can include a number of subsamples in the cone, spreading out over space and time and independently tracking distance to scene objects.

Thus, the computation of the integration result may be integrated over time, rather than being restricted to a single point in time. The shape, position, direction, angle, orientation, and any other parameters of camera cones 122 and object geometry 154 may dynamically change over time, for example to provide motion-blur, depth warping, or other effects. Fast moving objects may also be rendered with less detail, as they will be blurred anyway in the final render.

The variance of the integrand may also be estimated to provide for adaptive sampling. The estimated variance may be tracked and compared against a noise tolerance threshold. The noise tolerance threshold is set such that an individual ray trace provides a minimum quality level. As each of camera cones 122 represents only a fractional contribution to output image 128 and may hit only a fractional surface area of a particular geometry surface and a fractional solid angle, the noise tolerance threshold may be increased for each cone as the effects of the individual rays within the cones become increasingly attenuated.

If the tracked variance of a cone exceeds the noise threshold, then the directional sampling may be refined with increased precision and filtering by cone subdivision or super-sampling to meet the noise threshold. This refining step may also be deferred until a subset or all of camera cones 122 are shaded to reduce the working set. On the other hand, if a large buffer is available between the variance and the noise threshold, for example due to the use of a wide cone, then fewer directional samples may be taken, or computational shortcuts such as probabilistic integration or stochastic sampling may be utilized. Additionally, as previously discussed, the size of the cone may be set for a desired level-of-detail (LOD), for example by comparing a size of the cone to a size of the set of intersecting scene objects to determine the LOD.

After processing of geometry node 124 against camera cones 122 is finished, the current geometry node 124 may be freed from memory 114, the next geometry node 124 may be streamed from object geometry 154, and integration tracing (block 420), shading and bouncing (block 430), and shading refinements (block 440) may be repeated for the new geometry node 124. The selection of the new geometry node 124 may be based on a traversal hierarchy, as previously discussed. Alternatively, object geometry 154 may already be partially or wholly cached within memory 114. While the above example assumes that workstation 110 solely renders output image 128, alternative implementations may distribute the streaming of geometry nodes for parallel processing using multiple computing devices, for example servers 145a, 145b, and 145c.

New global illumination bounce passes may be executed by repeating the prior actions in blocks (420), (430), and (440). Sufficiently high quality results may be provided even with a small number of passes, for example 2-4.

Once the final bounce pass has been completed and the integration results have been accumulated into the previous passes, the camera cone integration results may be combined to form a final output image. Accordingly, output image 128 is now ready to be stored in non-volatile storage as part of a larger render project, and may also be shown on display 118 for observation and possible adjustment by user 130.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing device for providing integration cone tracing, the computing device comprising:
a processor configured to:
arrange a scene having a plurality of scene objects into a scene bounding hierarchy;
intersect a cone with the scene bounding hierarchy to determine an intersecting set of scene objects from the plurality of scene objects;
compute an integration result for the intersecting set of scene objects by a directional sampling within the cone, wherein the integration result is computed using the directional sampling by ray tracing within the cone, and wherein an integrand for the computing of the integration result is a radiance estimate; and
shade an output image based on the integration result.

2. The computing device of claim 1, wherein the computing of the integration result further bounces the cone for multi-pass global illumination.

3. The computing device of claim 1, wherein the cone includes stencils for calculating object visibility of the scene.

4. The computing device of claim 1, wherein the cone is a shape selected from the group consisting of a cone, a curved cone, a polygonal shape, a time-varying shape, and a non-circular shape.

5. The computing device of claim 1, wherein the computing of the integration result is from a base of the cone along a cone axis in one direction.

6. The computing device of claim 5, wherein the base of the cone is selected from an apex of the cone or a section of the cone at a distance from the apex of the cone.

7. The computing device of claim 1, wherein the directional sampling within the cone is by rays.

8. The computing device of claim 1, wherein the directional sampling within the cone is by cones.

9. The computing device of claim 1, wherein an integrand for the computing of the integration result is a visibility estimate.

10. The computing device of claim 1, wherein the computing of the integration result estimates a gradient of the integrand.

11. The computing device of claim 10, wherein the gradient is used to perform a smooth reconstruction of the integrand.

12. A computing device for providing integration cone tracing, the computing device comprising:
a processor configured to:
arrange a scene having a plurality of scene objects into a scene bounding hierarchy;
intersect a cone with the scene bounding hierarchy to determine an intersecting set of scene objects from the plurality of scene objects;
compute an integration result for the intersecting set of scene objects by a directional sampling within the cone, wherein the integration result is computed using the directional sampling by ray tracing within the cone; and
shade an output image based on the integration result;
wherein the computing of the integration result estimates a variance of an integrand.

13. The computing device of claim 12, wherein the variance is used to refine the directional sampling.

14. The computing device of claim 13, wherein the variance is compared to a noise tolerance threshold to determine a degree of the refinement.

15. The computing device of claim 14, wherein the refining is by subdividing the cone if the variance in the cone exceeds the noise tolerance threshold.

16. A computing device for providing integration cone tracing, the computing device comprising:
a processor configured to:
arrange a scene having a plurality of scene objects into a scene bounding hierarchy;
intersect a cone with the scene bounding hierarchy to determine an intersecting set of scene objects from the plurality of scene objects;
compute an integration result for the intersecting set of scene objects by a directional sampling within the cone, wherein the integration result is computed using the directional sampling by ray tracing within the cone; and
shade an output image based on the integration result;
wherein the computing of the integration result compares a size of the set of scene objects to a size of the cone to determine a level-of-detail (LOD).

17. The computing device of claim 1, wherein the computing of the integration result is performed over time.

18. A method for providing integration cone tracing for use by a computing device having a processor, the method comprising:
arranging, by the processor, a scene having a plurality of scene objects into a scene bounding hierarchy;
intersecting, by the processor, a cone with the scene bounding hierarchy to determine an intersecting set of scene objects from the plurality of scene objects;
computing, by the processor, an integration result for the intersecting set of scene objects by a directional sampling within the cone, wherein the integration result is computed using the directional sampling by ray tracing within the cone; and
shading, by the processor, an output image based on the integration result;
wherein the computing of the integration result includes at least one of:
comparing a size of the set of scene objects to a size of the cone to determine a level-of-detail (LOD);
estimating a radiance or a variance of an integrand.

19. The method of claim 18, wherein the computing of the integration result further bounces the cone for multi-pass global illumination.

* * * * *